US012568297B2

(12) United States Patent
Kong et al.

(10) Patent No.: US 12,568,297 B2
(45) Date of Patent: Mar. 3, 2026

(54) CAMERA MONITORING SYSTEM DISPOSED ON A PANEL OF A VEHICLE BODY

(71) Applicants: HYUNDAI MOTOR COMPANY, Seoul (KR); KIA CORPORATION, Seoul (KR); SMR AUTOMOTIVE MODULES KOREA LTD., Cheongju-si (KR)

(72) Inventors: Nak Kyoung Kong, Seongnam-si (KR); Dae Hee Lee, Incheon (KR); Kyung Hwan Kim, Seoul (KR); Sang Heon Wang, Bucheon-si (KR); Won Sik Hong, Incheon (KR); Houng Young Shin, Incheon (KR); Chang Hwan Lim, Seoul (KR); Sung Min Cho, Siheung-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 209 days.

(21) Appl. No.: 18/204,792

(22) Filed: Jun. 1, 2023

(65) Prior Publication Data

US 2023/0421880 A1      Dec. 28, 2023

(30) Foreign Application Priority Data

Jun. 24, 2022   (KR) ........................ 10-2022-0077310

(51) Int. Cl.
H04N 23/57 (2023.01)
H04N 23/51 (2023.01)

H04N 23/667 (2023.01)
B60R 11/04 (2006.01)

(52) U.S. Cl.
CPC ............. H04N 23/57 (2023.01); H04N 23/51 (2023.01); H04N 23/667 (2023.01); B60R 11/04 (2013.01)

(58) Field of Classification Search
None
See application file for complete search history.

(56) References Cited

U.S. PATENT DOCUMENTS 9,457,733 B2     10/2016   Schütz
2017/0050568 A1     2/2017   Sobecki et al.
2019/0009735 A1*    1/2019   Ahn ........................ B60R 11/04

FOREIGN PATENT DOCUMENTS

KR         20070063485 A      6/2007

* cited by examiner

*Primary Examiner* — Samira Monshi
(74) *Attorney, Agent, or Firm* — Lempia Summerfield Katz LLC

(57) ABSTRACT

A camera monitoring system (CMS) disposed on a panel of a vehicle body. A housing is disposed on a vehicle body. A movable housing is movable along the housing. A CMS camera is disposed on one end of the movable housing. A motor part provides driving force by which the movable housing moves along the housing. A transparent part is disposed on the housing and is located in an area facing the CMS camera when the movable housing is retracted into the housing. A controller controls a driving amount of the motor part and controls turning on/off of the CMS camera.

15 Claims, 5 Drawing Sheets

CAMERA MONITORING SYSTEM DISPOSED ON A PANEL OF A VEHICLE BODY

CROSS REFERENCE TO RELATED APPLICATION

The present application claims priority to Korean Patent Application No. 10-2022-0077310, filed Jun. 24, 2022, the entire contents of which are incorporated herein for all purposes by this reference.

BACKGROUND

Technical Field

The present disclosure relates generally to a camera monitoring system disposed on a panel of a vehicle body and, more particularly, to a camera monitoring system disposed on a panel of a vehicle body and configured to protrude from a vehicle in response to a user's request, wherein the camera monitoring system may capture images in a sideward direction from the vehicle not only in an extended position but also in a retracted position.

Description of the Related Art

Generally, a vehicle driver changes lanes using a rear-view mirror mounted on the center front of the interior of the vehicle and using a side-view mirror. When the driver changes lanes while watching the side mirror in the direction in which the driver intends to move, a collision may sometimes occur with a vehicle traveling in a blind spot or in front of the driver's vehicle.

In addition, a side mirror of the related art is configured to be folded inward from an outwardly-protruding position when a vehicle is parked or stopped. The side mirror may be fractured by physical impact.

In this regard, recently, a camera monitoring system (CMS) configured to display the external situation on a display using an external camera has come into prominence.

In a vehicle to which a CMS is introduced, an external camera protruding from the vehicle captures images of the external situation. A display part provided inside the vehicle displays images captured by the external camera.

FIG. 1 illustrates an external camera configuration of the related art, mounted on the exterior of a vehicle and configured to protrude when unfolded.

As illustrated in FIG. 1, the external camera configuration includes an external camera 20 disposed on a portion of a vehicle door 11. The external camera 20 includes a first lens 30 and a second lens 31 and is configured to fold into the door.

However, even in the case that the external camera is retracted into the door, an outwardly-protruding shape of the external camera is exposed to the outside. Thus, there is a danger that the camera may be damaged or stolen.

In addition, the external camera configured to be retracted into the door by folding has a limited range of extension. Thus, it is difficult to obtain a sufficient field of view in a lateral-backward direction.

The foregoing is intended merely to aid in understanding the background of the present disclosure. The foregoing is not intended to mean that the present disclosure falls within the purview of the related art that is already known to those having ordinary skill in the art.

SUMMARY

Accordingly, the present disclosure has been made keeping in mind the above problems occurring in the related art. The present disclosure is intended to propose a camera monitoring system disposed on a panel of a vehicle. The camera monitoring system is configured to be selectively extended at a user request.

Also provided is a camera monitoring system able to capture images even in a case in which a camera monitoring system (CMS) camera is retracted.

The objective of the present disclosure is not limited to the aforementioned description. Other objectives not explicitly disclosed herein should be clearly understood by those having ordinary skill in the art from the description provided hereinafter. In addition, the objectives of the present disclosure may be realized by elements described in the Claims and combinations thereof.

In order to achieve at least one of the above objectives, according to one aspect of the present disclosure, a camera monitoring system or CMS is provided. The camera monitoring system includes: a housing disposed on a vehicle body; a movable housing movable along the housing; a CMS camera disposed on one end of the movable housing; a motor part configured to provide driving force by which the movable housing moves along the housing; a transparent part disposed on the housing and located in an area facing the CMS camera when the movable housing is retracted into the housing; and a controller. The controller is configured to control a driving amount of the motor part and control turning on/off of the CMS camera.

The camera monitoring system may further include a rotary link fastened to a rotary shaft of the motor part and a link rod with one end being fastened to the rotary link and the other end being fastened to the movable housing.

The link rod may include a curved portion. The curved portion may be configured to move to an area adjacent to the motor part when the movable housing is retracted into the housing in response to rotation of the rotary link.

The camera monitoring system may further include a plate disposed on the housing and the movable housing. The plate may be fastened to the link rod and configured to move integrally with the movable housing along the housing in response to rotation of the motor part.

The camera monitoring system may further include a position restraining protrusion disposed inside the movable housing and a guide hole provided in the plate and allowing the position restraining protrusion to move in a longitudinal direction in response to driving of the motor part.

The controller may rotate the link rod by the driving of the motor part to move the plate fastened to one end of the link rod. The guide hole may be moved integrally with the plate to move the movable housing including the position restraining protrusion.

The camera monitoring system may further include a cable configured to apply electric power from the vehicle body to the movable housing and a fixing part disposed on the plate to fix the cable.

The camera monitoring system may further include an around view monitoring (AVM) camera disposed on the movable housing.

The camera monitoring system may further include a gasket disposed in an area in which the movable housing and the housing face each other.

The controller may be configured to control a speed at which the movable housing moves along the housing by varying a driving speed of the motor part.

The controller may be disposed on a panel of the vehicle body configured to move at a relatively low speed when the movable housing starts or ends movement in a longitudinal direction.

The housing may be disposed on a panel of the vehicle body fastened and fixed to the vehicle body.

The housing may include a base on which the motor part is disposed and bolt-fixed to the vehicle body and a housing body configured to be fastened to the base.

According to the present disclosure, it is possible to obtain the following effects from embodiments and configurations described above and described in further detail below, as well as combinations and in-use relations thereof.

The camera monitoring system provided on the vehicle body panel may be selectively extended depending on the driving environment to be safe from the external environment.

In addition, the camera monitoring system is located in an area adjacent to a panel of a vehicle to provide a wider rear field of view.

Furthermore, the camera monitoring system may reliably provide images captured in a lateral-backward direction from the vehicle, even in a retracted position, thereby allowing the vehicle to be driven more safely.

BRIEF DESCRIPTION OF THE DRAWINGS

The above and other objectives, features, and other advantages of the present disclosure should be more clearly understood from the following detailed description when taken in conjunction with the accompanying drawings, in which.

DETAILED DESCRIPTION OF THE DISCLOSURE

Figure 1:
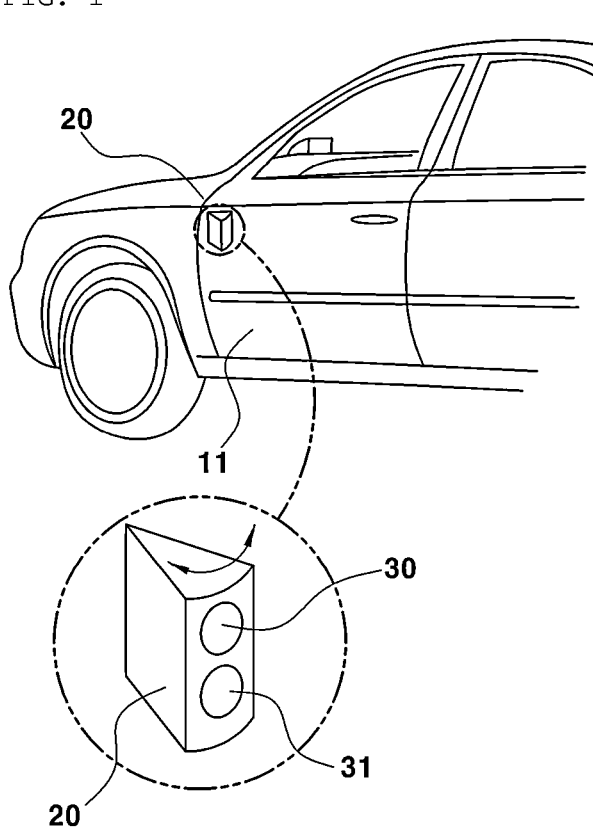
FIG. 1 illustrates a configuration of a vehicle including a camera monitoring system of the related art.

Hereinafter, embodiments of the present disclosure are described in more detail with reference to the accompanying drawings. Embodiments of the present disclosure may be variously modified in form, and the scope of the present disclosure should not be construed as being limited to the embodiments described below. Embodiments are provided to more fully illustrate the present disclosure to those having ordinary skill in the art.

In addition, terms such as "unit (or part)", "system", and "camera" refer to elements respectively performing at least one function or operation. The unit, system, camera, or the like may be implemented as software, hardware, or a combination thereof.

In addition, terms used herein are used to describe a specific embodiment and are not intended to limit the present disclosure. Also, a singular expression may include a plural expression unless the context clearly indicates otherwise. Further, when a component, device, element, or the like, of the present disclosure, is described as having a purpose or performing an operation, function, or the like, the component, device, or element should be considered herein as being "configured to" meet that purpose or to perform that operation or function.

Hereinafter, embodiments according to the present disclosure are described in detail with reference to the accompanying drawings. Identical or similar constituent elements are given the same reference numerals throughout the drawings, and a repetitive description thereof has been omitted.

A camera monitoring system 10 is disposed on a panel of a vehicle body 700 and includes a camera monitoring system (CMS) camera 210. The term "panel" used herein is intended to refer to a door panel, a front side panel, a rear side panel, an A-pillar, a B-pillar, or the like of the vehicle. Furthermore, the panel includes any configuration forming an outer portion of the vehicle body 700.

Figure 2:
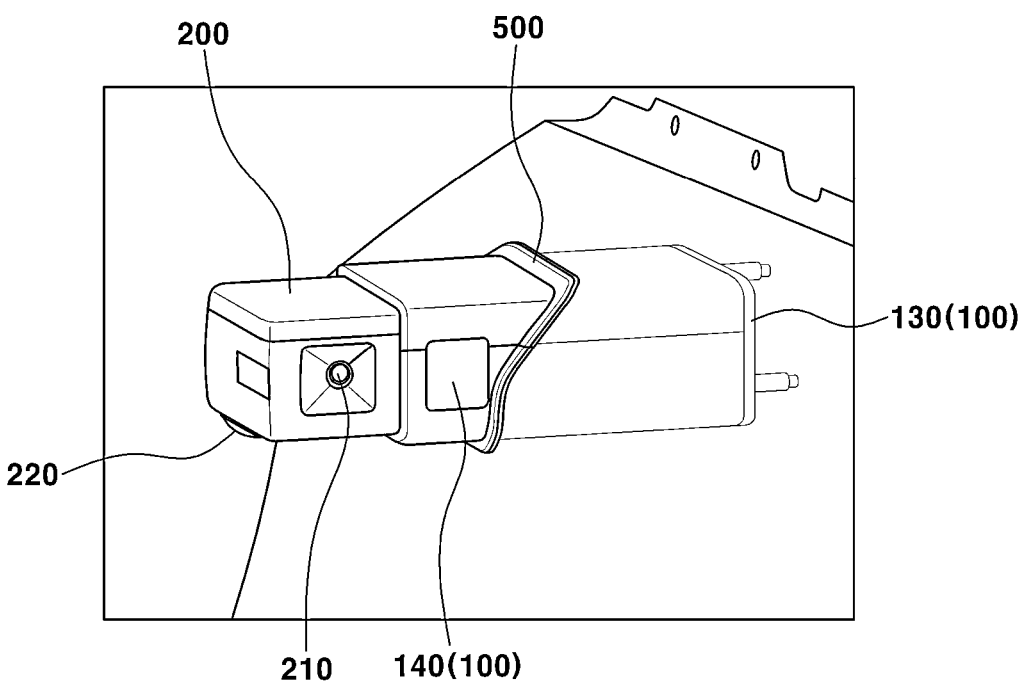
FIG. 2 illustrates a camera monitoring system according to an embodiment of the present disclosure, disposed on a panel of a vehicle body.
Figure 3:
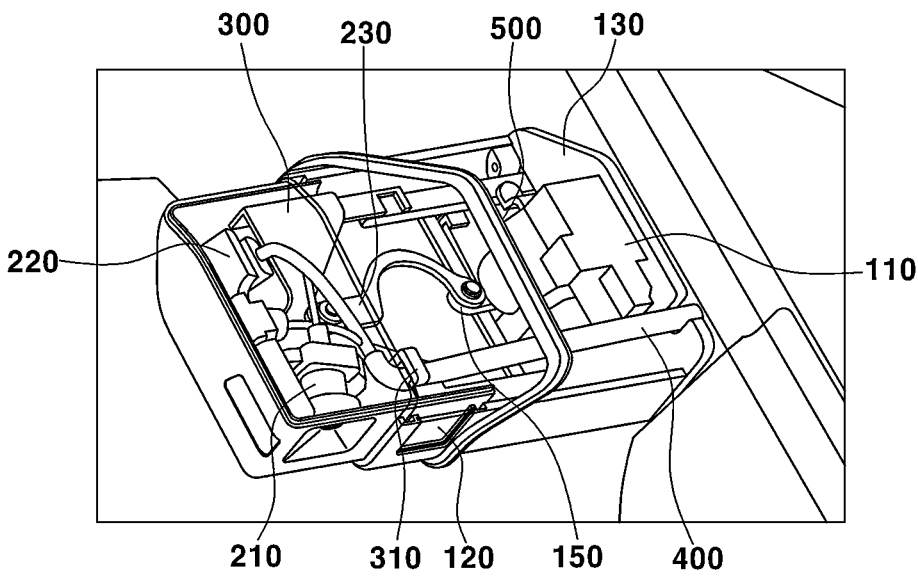
FIG. 3 illustrates a configuration of the camera monitoring system according to an embodiment of the present disclosure, disposed on the panel of the vehicle body.

As illustrated in FIGS. 2 and 3, the present disclosure provides the camera monitoring system 10 according to an embodiment of the present disclosure, disposed on the door panel, as a configuration fixedly provided on the vehicle body 700.

The camera monitoring system 10 according to the present disclosure includes a housing 100 provided on the vehicle body 700 including a door panel and includes a movable housing 200 configured to extend or retract along the inner surface of the housing 100 in the longitudinal direction. The CMS camera 210 is provided on one end of the movable housing 200 and is configured to capture images in a lateral-backward direction from the vehicle. Furthermore, the camera monitoring system 10 may extend through the door panel and be fixedly provided on the vehicle body.

In addition, an around view monitoring (AVM) camera 220 may be provided on the movable housing 200. Furthermore, the housing 100 includes a transparent part 120 allowing images in the lateral-backward direction to be captured in a position in which the movable housing 200 is retracted into the housing 100.

The housing 100 is disposed on the panel of the vehicle body 700 and the panel is configured to be fixedly fastened to the vehicle body 700. Furthermore, a motor part 110 is provided inside the housing 100, a base 130 is fixed, such as by a bolt, to the vehicle body 700, and a housing body 140 is fastened to the base 130. The movable housing 200 is configured to be retracted into housing body 140 of the housing 100.

A bolt part provided on the base 130 is configured to be retracted into the vehicle body 700 from outside of the vehicle body 700 and be fixed to the vehicle body 700. The housing body 140 provided in the base 130 is configured to have a cavity therein.

A gasket 500 is provided on open peripheral portions of the housing 100 configured to enclose the movable housing

200. The gasket 500 may prevent raindrops. dust, or other contaminants from entering the housing body 140 of the housing 100 as the movable housing 200 moves.

At least one end of the movable housing 200 remains retracted into the housing 100. The movable housing 200 is configured to be extended outward from or retracted into the vehicle with respect to the housing 100. This is accomplished as driving force from the motor part 110 provided inside the housing 100 is applied to the movable housing 200.

The movable housing 200 is configured to be fastened to a rotary link 150 of the motor part 110 provided in the housing 100 through a link rod 230. One end of the rotary link 150 is fastened to the rotating shaft of the motor part 110 and the other end of the rotary link 150 is fastened to the link rod 230. More particularly, a plate 300 is provided inside the movable housing 200 and the housing 100 in the longitudinal direction and one end of the link rod 230 is fastened to the plate 300. Furthermore, the plate 300 is coupled to the movable housing 200 to move integrally with the movable housing 200. Thus, in response to the movement of the link rod 230, the movable housing 200 moves integrally with the plate 300.

Furthermore, the plate 300 is coupled to the movable housing 200 to be slidable along the inner side surface of the housing 100 in the longitudinal direction. The plate 300 may move integrally with the movable housing 200 in response to driving force of the motor part 110.

When rotational force of the motor part 110 is applied under the control of a controller 600, the rotary link 150 fastened to the central shaft of the motor part 110 is rotated and moved. Furthermore, the link rod 230 fastened to the other end of the rotary link 150 is configured to move in the longitudinal direction of the housing 100. In an embodiment of the present disclosure, the rotary link 150 is rotated 180° by the rotating force of the motor part 110, and one end of the link rod 230 fastened to the rotary link 150 is rotated integrally with the rotary link 150. The other end of the link rod 230 fastened to the plate 300 is configured to move along with a longitudinal displacement of one end of the rotary link 150 to which the link rod 230 is fastened.

The link rod 230 and the rotary link 150 are fastened to each other to restrain longitudinal movement of each other and are reconfigured to freely rotate with respect to each other about a connection point. Thus, the link rod 230 fastened to the plate 300 or movable housing 200 is configured to move in the longitudinal direction integrally with the movable housing 200 and the plate 300 in response to rotating force of the rotary link 150. In an embodiment of the present disclosure, the movable housing 200 is configured to have a travel distance equal to two times the length of the rotary link 150 to be retracted into the housing 100 at the travel distance.

Furthermore, when the rotary link 150 is rotated 180°, the link rod 230 includes a curved portion 240 such that the link rod 230 may move without interference with the motor part 110. Thus, when the rotary link 150 is moved into the vehicle by rotation of 180° so that the movable housing 200 is retracted into the housing 100, the curved portion 240 is moved to a position adjacent to the motor part 110. In other words, the link rod 230 is configured to move to the position adjacent to the motor part 110 in response to the rotation of the rotary link 150 due to the shape of the curved portion 240. More particularly, the curved portion 240 may have a shape corresponding to the top end or the bottom end of the cross-section of the motor part 110.

The around view monitoring (AVM) camera 220 is provided on the movable housing 200 and a cable 400 extends from the vehicle body 700 such that power may be applied to the CMS camera 210 through the cable 400. In addition, a fixing part 310 is provided on the plate 300 to fix the cable 400. The cable 400 is configured to be movable integrally with the plate 300 in response to the movement of the movable housing 200.

The controller 600 may control driving force of the motor part 110 so that the movable housing 200 is retracted into the housing body 140 of the housing 100 at a user request or according to the driving environment. In other words, when a user request is applied that requests the camera monitoring system 10 be retracted or when a driving environment of a predetermined or higher speed or a parking environment is recognized, the controller 600 controls the motor part 110 so that the movable housing 200 is retracted into the housing 100.

Furthermore, the controller 600 is configured to control turning on/off of at least one of the AVM camera 220 or the CMS camera 210 and display images captured using at least one of the AVM camera 220 or the CMS camera 210 on a display part (not shown) provided on the interior of the vehicle.

The display part may be implemented as a liquid crystal display (LCD), a light-emitting diode (LED) display, an organic light-emitting diode (OLED) display, or the like. More particularly, the display part according to the present disclosure may be an OLED display retracted into an A-pillar.

In addition, the controller 600 according to the present disclosure controls the display part to display lateral-backward images received from the CMS camera 210. The angle, height, or area of images to be displayed may be set according to the user request.

Furthermore, the controller 600 controls the movable housing 200 to move at a relatively low speed when the longitudinal movement of the movable housing 200 is initiated or ended. That is to say, the controller 60 controls the speed of the motor part 110 when the movable housing 200 starts to be retracted or extended. Thus, the housing 100 and the movable housing 200 may stably move in the movement of the movable housing 200. In addition, the speed of the movement of the movable housing 200 may be set to be relatively low before the extending or the retraction is completed.

Figure 4A:
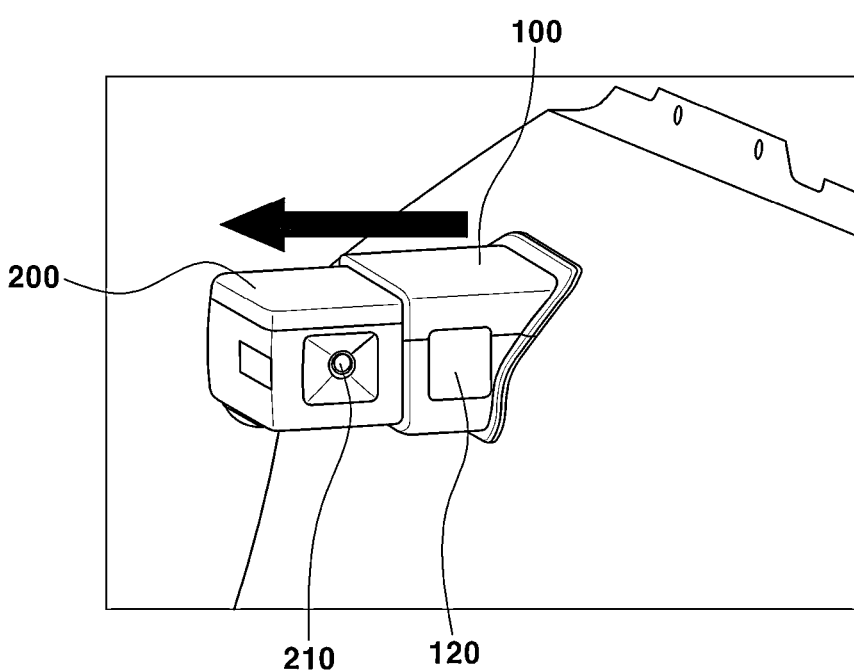
FIG. 4A illustrates an extended shape of the camera monitoring system according to an embodiment of the present disclosure, disposed on the panel of the vehicle body.
Figure 4B:
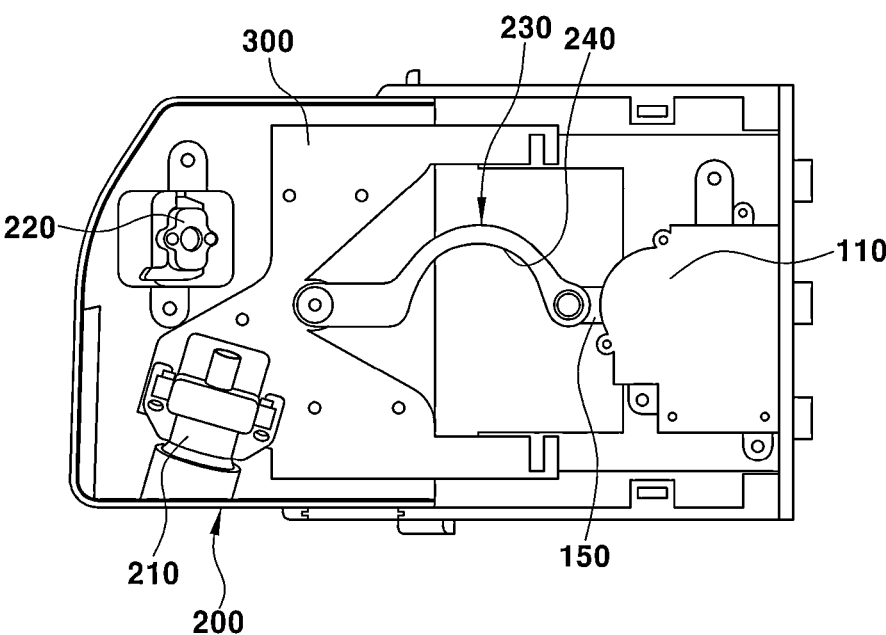
FIG. 4B illustrates a cross-sectional view of the extended camera monitoring system according to an embodiment of the present disclosure, disposed on the panel of the vehicle body.

FIG. 4A illustrates an extended shape of the camera monitoring system according to an embodiment of the present disclosure, disposed on the panel of the vehicle body. FIG. 4B illustrates a cross-sectional view of the extended camera monitoring system according to an embodiment of the present disclosure, disposed on the panel of the vehicle body.

In response to an instruction from the controller 600, the movable housing 200 is extended outward in the longitudinal direction of the housing 100 from the initial retracted position. Thus, the controller 600 drives the motor part 110 so that the rotary link 150 is rotated 180° in a direction away from the inside of the vehicle.

The link rod 230 fastened to the rotary link 150 rotated in this manner is configured to have a travel distance the same as a longitudinal displacement of the distal end fastened to the rotary link 150. The plate 300 fastened to the other end of the link rod 230 is configured to move integrally with the movable housing 200 and longitudinally in a direction away from the vehicle body.

As illustrated in FIG. 4B, one end of the rotary link 150 is rotated to a position most distant from the vehicle body 700. The link rod 230 fastened to the rotary link 150 is configured to be moved integrally with the plate 300 and the movable housing 200 in the longitudinal direction of the housing 100 so as to be located most distant from the housing 100.

In the extended position of the movable housing 200, the CMS camera 210 and the AVM camera 220 are configured to capture external images in a position exposed to the outside.

Figure 5A:
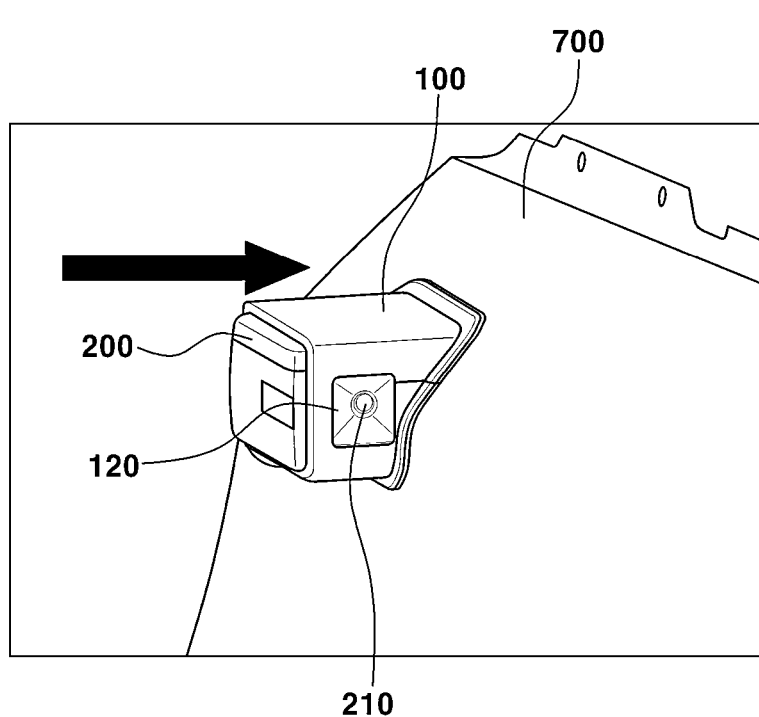
FIG. 5A illustrates a retracted shape of the camera monitoring system according to an embodiment of the present disclosure, disposed on the panel of the vehicle body.
Figure 5B:
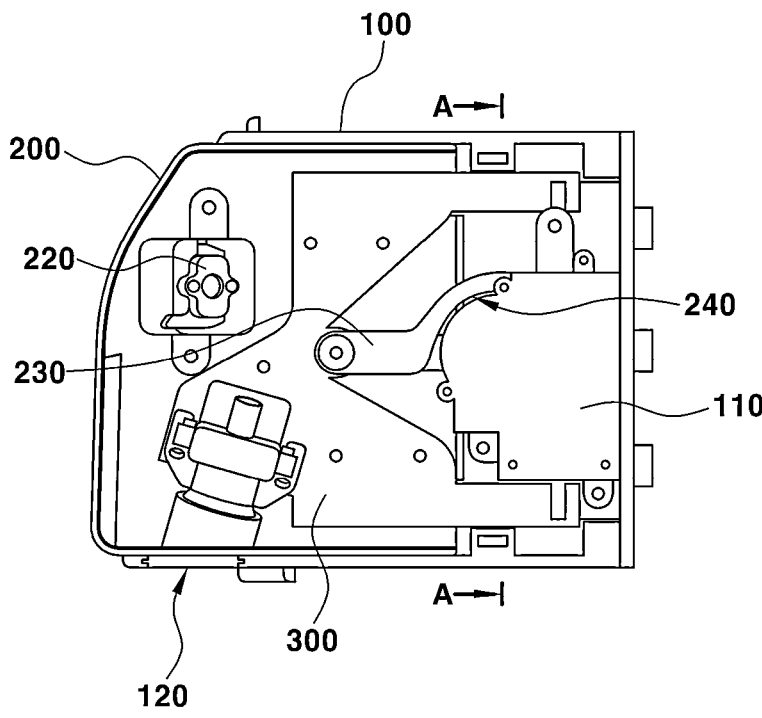
FIG. 5B illustrates a cross-sectional view of the retracted camera monitoring system according to an embodiment of the present disclosure, disposed on the panel of the vehicle body.

In comparison to the above, FIGS. 5A and 5B illustrate the movable housing 200 retracted into the housing 100.

In response to the application of driving force of the motor part 110, one end of the rotary link 150 fastened to the motor part 110 is integrally rotated and the other end of the rotary link 150 is rotated to a position most adjacent to the vehicle body 700. As a result, the movable housing 200 moves integrally with the plate 300 along the housing 100 to be retracted into the housing 100.

The plate 300 has a guide hole 320 and is configured to guide longitudinal movement of a position restraining protrusion 250 provided on the rear surface of the movable housing 200. Thus, when the link rod 230 is fastened to and moves integrally with the plate 300, the guide hole 320 moves integrally with the position restraining protrusion 250 so that the movable housing 200 moves in the longitudinal direction of the housing 100.

In addition, the curved portion 240 provided on the link rod 230 is configured to conform to the outer shape of the motor part 110. When the rotary link 150 is fastened to the motor part 110 and one end of the rotary link 150 rotates, the curved portion 240 of the link rod 230 is rotated to a position adjacent to the motor part 110.

That is to say, one end of the link rod 230 rotating integrally with the rotary link 150 is moved to a side surface of the motor part 110 adjacent to the vehicle body 700. The curved portion 240 of the link rod 230 is located to surround the top end of the motor part 110. Furthermore, due to the plate 300 being fastened to the other end of the link rod 230, the movable housing 200 is moved into the housing 100 in response to the longitudinal movement of the link rod 230.

In a position in which the movable housing 200 is retracted into the housing 100, the CMS camera 210 is retracted to a position corresponding to the transparent part 120. The CMS camera 210 provided on the transparent part 120 is configured to capture images in the lateral-backward direction from the vehicle even when the movable housing 200 is retracted into the housing 100.

Figure 6:
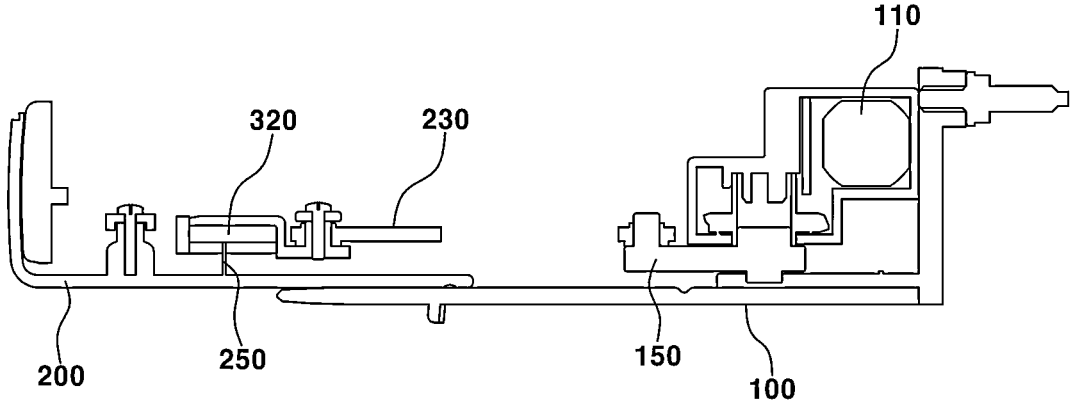
FIG. 6 illustrates a side cross-sectional view of the camera monitoring system according to an embodiment of the present disclosure.

FIG. 6 illustrates the fastening relationship between the plate 300 and the movable housing 200 according to an embodiment of the present disclosure.

As illustrated in the drawings, the plate 300 is provided in both the housing 100 and the movable housing 200. In addition, the plate 300 may slide along the inner surface of the housing 100.

The plate 300 is fastened to the link rod 230 and is movable in the longitudinal direction of the housing 100. The movable housing 200 is restrained to the plate 300 to move integrally with the plate 300.

More particularly, the position restraining protrusion 250 protrudes from the rear surface of the movable housing 200. The position restraining protrusion 250 is located inside the guide hole 320 located on the bottom surface of the plate 300. When the plate 300 having the guide hole 320 moves, the position restraining protrusion 250 located on the rear surface of the movable housing 200 is moved integrally with the guide hole 320. Thus, both the plate 300 and the movable housing 200 may move integrally and bidirectionally in the longitudinal direction of the housing 100.

The foregoing detailed description is merely illustrative of the present disclosure. In addition, the foregoing description renders several embodiments of the present disclosure and will be used through various combinations, modifications, and environments. In other words, the concept of the present disclosure may be changed or modified within the range of equivalence of the disclosure and/or the extent of the technique and knowledge of those having ordinary skill in the art. The above-described embodiments describe a best mode for embodying the technical idea of the present disclosure. Various modifications required for specific application fields and uses of the present disclosure are possible. Therefore, the detailed description of the present disclosure is not intended to limit the present disclosure to the foregoing embodiments. In addition, the appended claims should be construed to include other embodiments not specifically described herein.

What is claimed is:

1. A camera monitoring system comprising:

a housing disposed on a vehicle body;

a movable housing movable along the housing in a longitudinal direction of the housing;

a camera monitoring system (CMS) camera disposed on one end of the movable housing;

a motor part configured to provide driving force by which the movable housing moves along the housing;

a controller configured to control a driving amount of the motor part and control turning on/off of the CMS camera;

a rotary link fastened to a rotary shaft of the motor part; and a link rod with one end fastened to the rotary link and the other end fastened to the movable housing.

2. The camera monitoring system of claim 1, wherein the link rod comprises a curved portion, the curved portion configured to move to an area adjacent to the motor part when the movable housing is retracted into the housing in response to rotation of the rotary link.

3. The camera monitoring system of claim 1, further comprising a plate disposed on the housing and the movable housing, wherein the plate is fastened to the link rod and configured to move integrally with the movable housing along the housing in response to rotation of the motor part.

4. The camera monitoring system of claim 3, further comprising:

a position restraining protrusion disposed inside the movable housing; and a guide hole provided in the plate and allowing the position restraining protrusion to move in a longitudinal direction in response to driving of the motor part.

5. The camera monitoring system of claim 4, wherein the controller rotates the link rod by the driving of the motor part to move the plate fastened to one end of the link rod, and wherein the guide hole is moved integrally with the plate to move the movable housing including the position restraining protrusion.

6. The camera monitoring system of claim 3, further comprising:

a cable configured to apply electric power from the vehicle body to the movable housing; and a fixing part disposed on the plate to fix the cable.

7. The camera monitoring system of claim 1, further comprising an around view monitoring (AVM) camera disposed on the movable housing.

8. The camera monitoring system of claim 1, further comprising a gasket disposed in an area in which the movable housing and the housing face each other.

9. The camera monitoring system of claim 1, wherein the controller is configured to control a speed at which the movable housing moves along the housing by varying a driving speed of the motor part.

10. The camera monitoring system of claim 9, wherein the controller is disposed on a panel of the vehicle body configured to move at a relatively low speed when the movable housing starts or ends movement in a longitudinal direction.

11. The camera monitoring system of claim 1, wherein the housing is disposed on a panel of the vehicle body fastened and fixed to the vehicle body.

12. The camera monitoring system of claim 1, wherein the housing comprises:

a base on which the motor part is disposed and fixed to the vehicle body; and a housing body configured to be fastened to the base.

13. The camera monitoring system of claim 1, wherein the housing comprises:

a transparent part disposed on the housing and located in an area facing the CMS camera when the movable housing is retracted into the housing.

14. A camera monitoring system comprising:

a housing disposed on a vehicle body;

a movable housing movable along the housing;

a camera monitoring system (CMS) camera disposed on one end of the movable housing;

a motor part configured to provide driving force by which the movable housing moves along the housing; and a controller configured to control a driving amount of the motor part and control turning on/off of the CMS camera, wherein the housing comprises:

a transparent part disposed on the housing and located in an area facing the CMS camera when the movable housing is retracted into the housing.

15. A camera monitoring system comprising:

a housing disposed on a vehicle body;

a movable housing movable along the housing in a longitudinal direction of the housing;

a camera monitoring system (CMS) camera disposed on one end of the movable housing;

a motor part configured to provide driving force by which the movable housing moves along the housing; and a controller configured to control a driving amount of the motor part and control turning on/off of the CMS camera, wherein the housing comprises a transparent part disposed on the housing and located in an area facing the CMS camera when the movable housing is retracted into the housing.

\* \* \* \* \*